(12) United States Patent
Theisen et al.

(10) Patent No.: US 11,987,090 B1
(45) Date of Patent: May 21, 2024

(54) MAGNETIC MOTION CONTROL (71) Applicant: GM GLOBAL TECHNOLOGY OPERATIONS LLC, Detroit, MI (US)

(72) Inventors: Savannah Theisen, Highland, MI (US); Jeffrey L. Vogt, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/103,632

(22) Filed: Jan. 31, 2023

(51) Int. Cl.
*B60G 17/015* (2006.01)
*B60G 13/02* (2006.01)
*B60G 17/0165* (2006.01)
*B60G 17/06* (2006.01)

(52) U.S. Cl.
CPC ......... *B60G 17/0157* (2013.01); *B60G 13/02* (2013.01); *B60G 17/0165* (2013.01); *B60G 17/06* (2013.01); *B60G 2202/25* (2013.01); *B60G 2204/62* (2013.01); *B60G 2206/41* (2013.01); *B60G 2400/0512* (2013.01); *B60G 2400/208* (2013.01); *B60G 2400/252* (2013.01); *B60G 2400/842* (2013.01); *B60G 2500/104* (2013.01); *B60G 2600/182* (2013.01); *B60G 2600/26* (2013.01); *B60G 2800/162* (2013.01)

(58) Field of Classification Search
CPC ........... B60G 17/0157; B60G 13/02; B60G 17/0165; B60G 17/06; B60G 2202/25; B60G 2204/62; B60G 2206/41; B60G 2400/0512; B60G 2400/208; B60G 2400/252; B60G 2400/842; B60G 2500/104; B60G 2600/182; B60G 2600/26; B60G 2800/162
See application file for complete search history.

(56) References Cited

U.S. PATENT DOCUMENTS

| 8,935,047 | B2* | 1/2015 | Sekiya .................. | B60G 17/08 701/37 |
| 10,759,246 | B1* | 9/2020 | Erdozain, Jr. ......... | H01F 7/0231 |
| 2006/0224285 | A1* | 10/2006 | Izawa .................... | B60G 11/14 701/37 |

(Continued)

FOREIGN PATENT DOCUMENTS

DE 2442118 A1 3/1976

OTHER PUBLICATIONS

Office Action issued in corresponding German Patent Application 102023122956.7 dated Apr. 2, 2024.

*Primary Examiner* — Toan C To (57) ABSTRACT

A damping system includes a first magnetic damper pair mounted on a suspension system of a vehicle. The first magnetic damper pair includes a first magnet mounted on a first surface of a body of the vehicle and a second magnet mounted on a first moveable component of the suspension system coupled to a wheel of the vehicle. A sensor is mounted on the body of the vehicle or the wheel. A damping system control module is configured to receive, from the sensor, inputs indicative of a velocity and a displacement of the wheel relative to the body of the vehicle, calculate an amount of force to generate between the magnetic damper pair in a direction opposite a direction of movement of the wheel, and control supply of current to at least one of the first magnet and the second magnet to generate the calculated amount of force.

20 Claims, 4 Drawing Sheets

(56) References Cited

U.S. PATENT DOCUMENTS

| | | | |
|---|---|---|---|
| 2009/0079145 A1* | 3/2009 | Inoue | B60G 15/063 267/140.14 |
| 2011/0022265 A1* | 1/2011 | Sekiya | B60G 17/08 701/37 |
| 2015/0088379 A1* | 3/2015 | Hirao | B60G 17/016 701/37 |
| 2015/0224845 A1* | 8/2015 | Anderson | F03G 7/08 701/37 |
| 2022/0006385 A1* | 1/2022 | Kuroiwa | H02M 1/0054 |
| 2023/0382175 A1* | 11/2023 | Rogers | B60G 3/20 |

\* cited by examiner

MAGNETIC MOTION CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to damping systems for vehicle suspensions.

A suspension of a vehicle includes various components that couple a body of the vehicle to wheels of the vehicle. The suspension may implement a damping system (e.g., one or more dampers for each wheel) to control movement of the wheels relative to the body and/or to control for vibration. For example, the damping system reduces an amount of vibration transferred from the wheels and suspension to the body of the vehicle.

SUMMARY

A damping system includes a first magnetic damper pair mounted on or proximate to a suspension system of a vehicle. The first magnetic damper pair includes a first magnet mounted on a first surface of a body of the vehicle and a second magnet mounted on a first moveable component of the suspension system coupled to a wheel of the vehicle. At least one sensor is mounted on the body of the vehicle or the wheel. A damping system control module is configured to receive, from the sensor, inputs indicative of a velocity of the wheel relative to the body of the vehicle and a displacement of the wheel relative to the body of the vehicle, calculate an amount of force to generate between the magnetic damper pair in a direction opposite a direction of movement of the wheel, and control supply of current to at least one of the first magnet and the second magnet to generate the calculated amount of force.

In other features, the first magnet is an electromagnet and the second magnet is a permanent magnet.

In other features, the second magnet is mounted to a control arm of the suspension system coupled between the body of the vehicle and the wheel.

In other features, the damping system further includes a second magnetic damper pair, the second magnetic damper including a third magnet mounted on a second surface of the body of the vehicle, and a fourth magnet mounted on a second moveable component of the suspension system coupled to the wheel of the vehicle.

In other features, the first magnet is a first electromagnet, the second magnet is mounted to a first control arm of the suspension system coupled between the body of the vehicle and the wheel, the third magnet is a second electromagnet, and the fourth magnet is mounted to a second control arm of the suspension system coupled between the body of the vehicle and the wheel.

In other features, the damping system control module is configured to determine the direction of movement of the wheel and selectively control the supply of current to one of the first magnet and the third magnet based on the determined direction of movement of the wheel.

In other features, the damping system control module is configured to control the supply of current to the first magnet in response to a determination that the wheel is moving in a first direction and control the supply of current to the third magnet in response to a determination that the wheel is moving in a second direction.

In other features, the damping system control module is configured to calculate a velocity component of a force to be applied by the first magnetic damper pair, calculate a displacement component of the force to be applied by the first magnetic damper pair, and calculate the amount of force based on the velocity component and the displacement component.

In other features, the damping system control module is configured to adjust the amount of force further based on an atmospheric temperature.

In other features, the damping system control module is configured to determine a pitch of the vehicle and adjust the amount of force based on the pitch of the vehicle.

In other features, the damping system control module is configured to determine a heave of the vehicle and adjust the amount of force based on the heave of the vehicle.

In other features, the damping system control module is configured to determine a wheel slip of the wheel and adjust the amount of force based on the wheel slip.

A method of controlling a damping system of a vehicle includes receiving, from at least one sensor mounted on a body of the vehicle or a wheel of the vehicle, inputs indicative of a velocity of the wheel relative to the body of the vehicle and a displacement of the wheel relative to the body of the vehicle and calculating an amount of force to generate between a first magnet and a second magnet of a first magnetic damper pair mounted on or proximate to a suspension system of the vehicle. The amount of force corresponds to force in a direction opposite a direction of movement of the wheel. The method further includes controlling supply of current to at least one of the first magnet and the second magnet to generate the calculated amount of force.

In other features, the method further includes controlling supply of current to at least one of a third magnet and a fourth magnet of a second magnetic damper pair mounted on or proximate to a suspension system of the vehicle.

In other features, the method further includes determining the direction of movement of the wheel and selectively controlling the supply of current to one of the first magnet and the third magnet based on the determined direction of movement of the wheel.

In other features, the method further includes controlling the supply of current to the first magnet in response to a determination that the wheel is moving in a first direction and controlling the supply of current to the third magnet in response to a determination that the wheel is moving in a second direction.

In other features, the method further includes calculating a velocity component of a force to be applied by the first magnetic damper pair, calculating a displacement component of the force to be applied by the first magnetic damper pair, and calculating the amount of force based on the velocity component and the displacement component.

In other features, the method further includes adjusting the amount of force further based on an atmospheric temperature.

In other features, the method further includes at least one of determining a pitch of the vehicle and adjusting the amount of force based on the pitch of the vehicle and determining a heave of the vehicle and adjusting the amount of force based on the heave of the vehicle.

In other features, the method further includes determining a wheel slip of the wheel and adjusting the amount of force based on the wheel slip.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A suspension of a vehicle may include a damping system to control movement of the wheels relative to the body of the vehicle and/or to reduce an amount of vibration transferred from the wheels and the suspension to the body of the vehicle. The damping system may include one or more dampers connected between the body and the wheels. Typically, the dampers include mechanical components directly coupled between a component of the suspension and the body. For example, a damper may be implemented as a hydraulic cylinder and spring assembly.

Damping performance may be affected by temperature, pressure, and/or other atmospheric conditions. For example, changes in temperature and pressure may change characteristics of liquids or gases used in hydraulic components, behavior of mechanical components such as springs, etc. In space (i.e., extraterrestrial) applications, atmospheric conditions interfere significantly with damping performance.

A damping system according to the present disclosure is configured to operate across a wide range of atmospheric conditions (e.g., between −200 and 150 degrees Celsius) without a decrease in damping performance. The damping system includes a plurality of magnets arranged to generate force to control and oppose movement of the wheels relative to the body of the vehicle. For example, the damping system includes pairs of magnets each including a first magnet (e.g., an adjustable electromagnet) arranged on the body and another magnet (e.g., a permanent magnet, such as a Neodymium magnet, a Samarium Cobalt magnet, etc.) arranged on a component of the suspension, such as a control arm coupled between the wheel and the body. One or more body and/or wheel sensors are configured to sense a velocity and position of the wheel relative to the body. The electromagnet is controlled to adjust a force generated between the electromagnet and the permanent magnet based on the sensed velocity and/or position of the wheel to control wheel movement and position and reduce suspension vibration. In some examples the damping system may be further configured to control the magnets to act as jounce stop, reduce jounce or rebound, etc.

Figure 1:
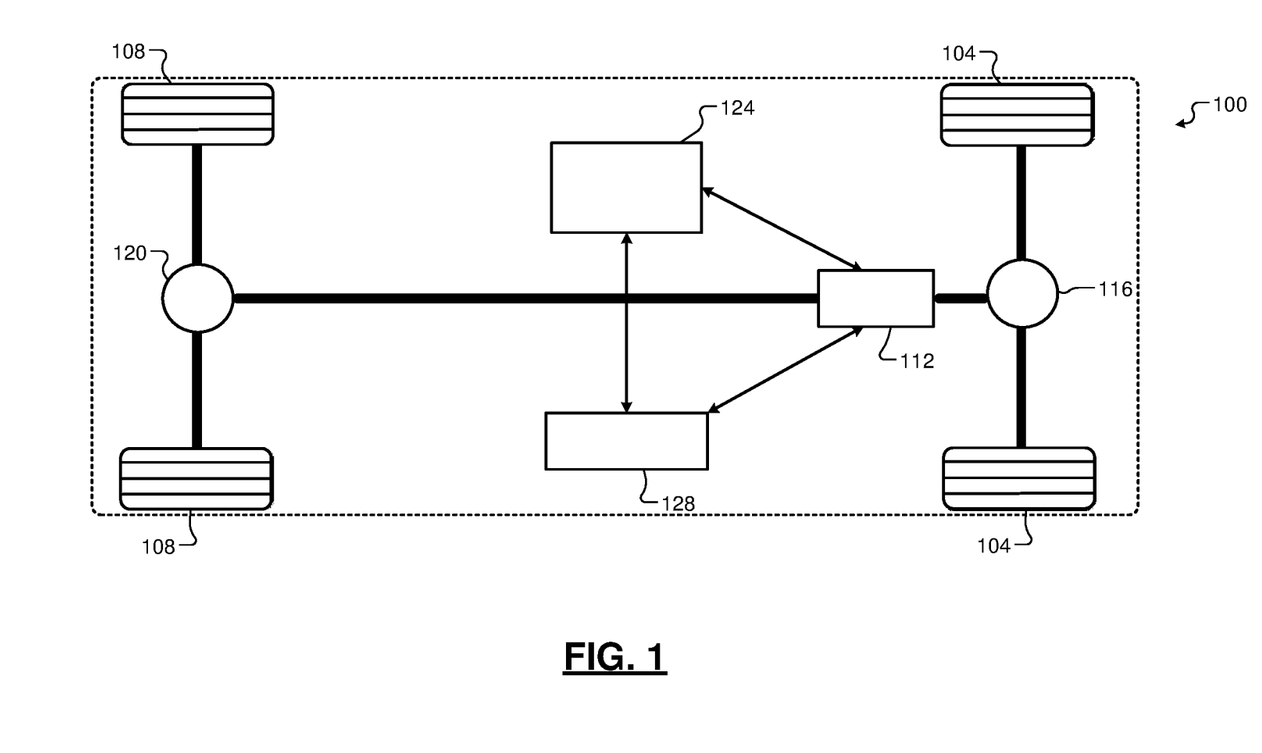
FIG. 1 illustrates an example vehicle implementing a damping system according to the present disclosure.

Referring now to FIG. 1, a vehicle 100 implementing a damping system according to the present disclosure is shown. The vehicle 100 may be a terrestrial vehicle or a vehicle configured for space (e.g., lunar, Mars, etc.) applications.

The vehicle 100 includes front wheels 104 and rear wheels 108. A drive unit 112 selectively outputs toque to the front wheels 104 and/or the rear wheels 108 via drive lines 116, 120, respectively. The vehicle 100 may include different types of drive units. For example, the vehicle may be an electric vehicle such as a battery electric vehicle (BEV), a hybrid vehicle, a fuel cell vehicle, a vehicle including an internal combustion engine (ICE), or other type of vehicle. For purposes of illustration, the vehicle 100 will be described as a BEV and the drive unit 112 corresponds to an electric motor powered by a battery system 124. In space applications, the battery system 124 may be configured as a solar powered/rechargeable battery system.

Some examples of the drive unit 112 may include any suitable electric motor, a power inverter, and a motor controller configured to control power switches within the power inverter to adjust the motor speed and torque during propulsion and/or regeneration. The battery system 124 provides power to or receives power from the electric motor of the drive unit 112 via the power inverter during propulsion or regeneration.

While the vehicle 100 as shown in FIG. 1 includes a single drive unit 112, the vehicle 100 may have other configurations. For example, two separate drive units may respectively drive the front wheels 104 and the rear wheels 108, one or more individual drive units may drive individual wheels, etc. As can be appreciated, other vehicle configurations and/or drive units can be used.

The battery system 124 may include any suitable arrangement of one or more battery cells, modules, etc. for providing power to components of the vehicle 100. The battery system 124 may output voltages at one or more levels, such as a high voltage level (e.g., 110V, 120V, 200V, 208V, 240V, 400V, 600V, 800V, etc.) to power vehicle components that operate on higher voltages, and a low voltage level (e.g., 3.3V, 5V, 12V, 24V, 48V, etc.) to power vehicle components that operate on lower voltages.

A vehicle control module 128 may be configured to control operation of one or more vehicle components, such as the battery system 124, the drive unit 112, components of the damping system, etc. For example, the vehicle control module 128 communicates with various sensors of the vehicle 100 and the damping system to control magnetic dampers of the damping system based on sensed inputs as described below in more detail. The vehicle control module 128 may include any suitable processing circuitry and memory to implement control functions, including examples of processes for controlling the damping system of the present disclosure. Portions of the vehicle control module 128 corresponding to control of the damping system may be referred to as a damping system control module.

Figure 2A:
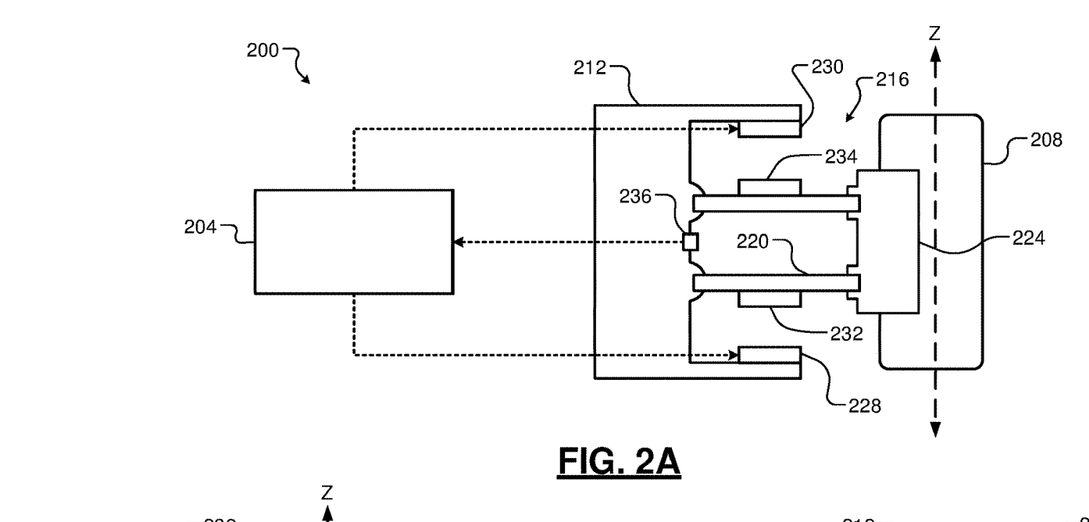
FIGS. 2A, 2B, and 2C illustrate an example damping system according to the present disclosure.

FIG. 2A shows a damping system 200 according to the present disclosure. The damping system 200 includes a damping system control module 204 configured to control aspects of the damping system 200. For example, the damping system control module 204 may be implemented within or by the vehicle control module 128 or may be comprised of circuitry shared by or separate from the vehicle control module 128.

The damping system control module 204 is configured to control movement of a wheel 208 relative to a body 212 of the vehicle 100 (e.g., in a Z direction parallel to a movement direction/axis of the vehicle 100). Although only one wheel and only a portion of the body 212 is shown, components of the damping system 200 described in FIG. 2 correspond to other wheels and respective body portions of the vehicle 100.

For example only, the wheel 208 is coupled to the body 212 via a suspension 216 including two control arms 220 (e.g., a double arm, four-link suspension). The control arms 220 are coupled between the body 212 and a wheel drum or hub 224. The control arms 220 are configured to actuate relative to the body 212 while stabilizing the wheel 208 as the wheel moves upward or downward relative to the body 212. In other examples, the principles of the present disclosure may be applied to different types of suspensions (e.g., strut, Hotchkiss, De Dion, multilink compound crank, etc.).

The damping system 200 is configured to control movement of the wheel 208 using magnetic dampers. For example, as shown, electromagnets 228 and 230 are arranged on fixed mounting surfaces, such as surfaces of the body 212. Conversely, permanent magnets 232 and 234 are arranged on moveable suspension components, such as the control arms 220. In one example, the electromagnets 228 and 230 and the magnets 232 and 234 are threaded into respective surfaces of the body 212 and the control arms 220.

Wires from a current source (e.g., the battery system 124 or another source powered by the battery system 124) are routed through the body 212 to the electromagnets 232 and 234. The damping system control module 204 is configured to selectively energize the electromagnets 228 and 230 to generate force between the electromagnets 228 and 230 and the respective magnets 232 and 234. For example, the electromagnet 228 and the magnet 232 form one magnetic damper pair and the electromagnet 230 and the magnet 234 form another magnetic damper pair. While only two magnetic damper pairs are shown, three or more magnetic damper pairs may be implemented for each wheel (e.g., two or more pairs per control arm).

Each magnetic damper pair is configured to generate a repulsion force when the corresponding electromagnet is energized. In other words, when the electromagnet 228 is energized, the magnet 232 (and the corresponding control arm 220) is repelled. Conversely, when the electromagnet 230 is energized, the magnet 234 is repelled. Further, an amount of force generated between each magnetic damper pair can be varied in accordance with sensed inputs indicating a velocity and position of the wheel 208 relative to the body 212. Although described herein as a repulsion force, in some examples an attracting force may be generated instead of or in addition to the repulsion force (e.g., by switching polarity of a current supplied to the electromagnets 228 and 230.

One or more wheel and/or body sensors 236 (as shown, mounted on the body 212) are configured to sense the velocity and position of the wheel 208 relative to the body 212. For example, the one or more sensors 236 may include a sensor located on the wheel 208 to measure displacement of the wheel 208 relative to the body 212 and velocity, and/or one or more sensors 236 located on the body 212 (as shown) to measure displacement of the control arms 220 and/or the wheel 208. The damping system control module 204 may be configured to calculate wheel displacement and velocity based on control arm displacement and velocity.

The damping system control module 204 receives sensed inputs from the sensors 236 and calculates the velocity and position of the wheel 208 based on the sensed inputs. The damping system control module 204 is configured to calculate an amount of damping needed to decrease the velocity of the wheel 208 (or, to cause the wheel 208 to move slow and transition to moving in the opposite direction). The damping system control module 204 then energizes (i.e., provides current to) a selected one of the electromagnets 228 and 230 to generate a repulsion force accordingly.

For example, if the wheel 208 is travelling at a velocity of 0.5 m/s in a first direction, the damping system control module 204 controls flow of current to the electromagnet 230 to ramp upward until the velocity decreases to 0, then ramps the current downward until the wheel 208 has returned to a centered or neutral position relative to the body 212. In some examples, the damping system control module 204 may ramp current to the electromagnet 228 upward as the current to the electromagnet 230 ramps downward and the wheel 208 approaches a desired position. In other examples, a constant current may be provided to the selected electromagnet.

Figure 2B:
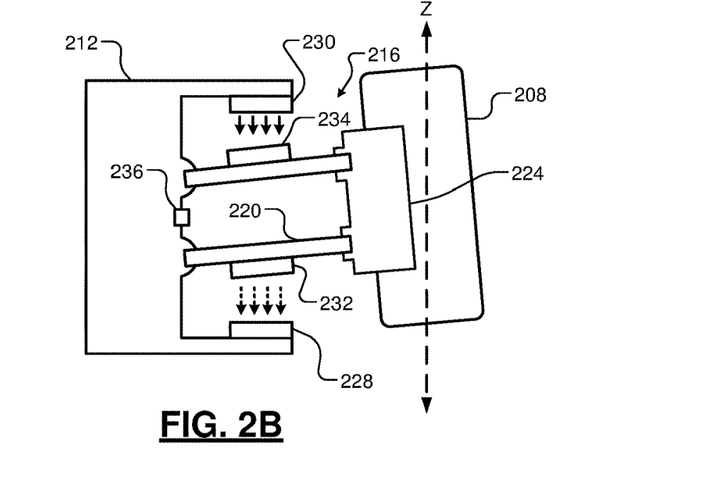
Figure 2C:
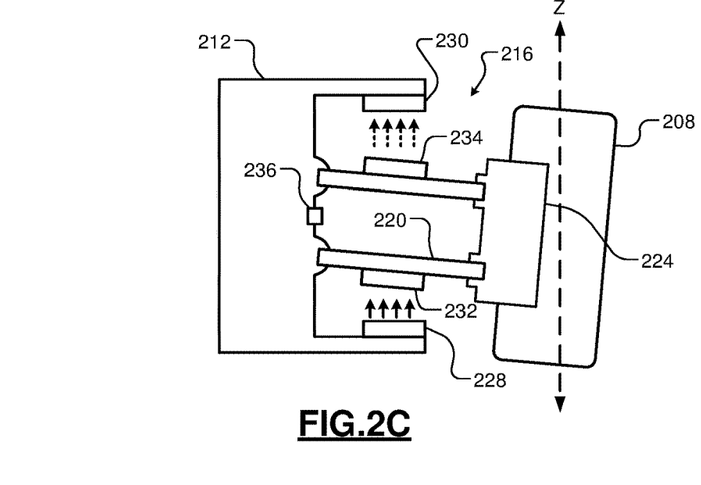

Referring now to FIGS. 2B and 2C and with continued reference to FIG. 2A, example movement of the wheel 208 and control of the electromagnets 228 and 230 are described. As shown in FIG. 2B, the wheel 208 is travelling upward in the Z direction (i.e., toward the body 212, upward into the fender of the vehicle 100). Upward movement of the wheel 208 as shown in FIG. 2B may be referred to as jounce. The sensors 236 output values indicative of the velocity and position of the wheel 208 relative to the body 212. The damping system control module 204 obtains a force need to repel and slow the movement of the wheel 208.

For example, the damping system control module 204 may obtain a force value from a lookup table that indexes wheel velocity to force, multiple lookup tables that index wheel velocity and displacement/position, respectively, to force, etc. In another example, the damping system control module 204 obtains the force value using an algorithm that outputs force based on the wheel velocity and displacement and one or more additional factors including, but not limited to, vehicle mass, center of gravity, and velocity, wheelbase, vehicle height (e.g., vertical displacement), pitch and yaw, etc.

The damping system control module 204 provides a current to the electromagnet 230 based on the obtained force value. Accordingly, a repulsion force is generated between the electromagnet 230 and the magnet 234, opposing the upward movement of the wheel 208. As a distance between the electromagnet 230 and the magnet 234 decreases, the force increases. Conversely, as the distance increases, the force decreases. Accordingly, velocity of the wheel 208 decreases as the displacement increases, and the repulsion force decreases when the wheel 208 reverses direction. In this manner, the repulsion force between the electromagnet 230 and the magnet 234 smoothly dampens movement of the wheel 208 and may also be used to minimize vibration of the vehicle 100 and minimize jounce or rebound.

Conversely, as shown in FIG. 2C, the wheel 208 is travelling downward in the Z direction (i.e., away from the body 212 of the vehicle 100). Downward movement of the wheel 208 as shown in FIG. 2C may be referred to as rebound. The sensors 236 output values indicative of the velocity and position of the wheel 208 relative to the body 212. The damping system control module 204 obtains a force need to repel and slow the movement of the wheel 208, provides a current to the electromagnet 228 based on the obtained force value, and a repulsion force is generated between the electromagnet 228 and the magnet 232, opposing the downward movement of the wheel 208.

In some examples, polarity of current supplied to the electromagnets 230 and 232 may be selectively reversed to generate an attraction force. In other words, instead of repelling the control arms 220 and the wheel 208, the electromagnetics 228 and 230 can be controlled to attract the control arms 220 and the wheel 208. As one example, one of the electromagnets 228 and 230 may be supplied with a current of a first polarity to generate a repulsion force (as shown by solid arrows in FIGS. 2B and 2C) while the other of the electromagnets 228 and 230 is supplied with a current of a second polarity to generate an attraction force (e.g., as shown by the dashed arrows in FIGS. 2B and 2C). As another example, each of the control arms 220 may have two different associated magnetic damper pairs. For example, one magnetic damper pair may be configured to generate a repulsion force for while the other magnetic damper pair is configured to generate an attraction force. In this manner, various magnetic damper pairs may be activated to repel and attract the wheel 208 in a desired direction.

In other examples, energization of the electromagnets 228 and 230 using a same current polarity (i.e., to generate repulsion force using both of the electromagnets 228 and 230) may overlap. For example, as the wheel 208 is repelled from the electromagnet 228 and approaches a desired position, the electromagnet 230 may be energized to slow the approach of the wheel 208 and prevent overshoot.

Figure 3:
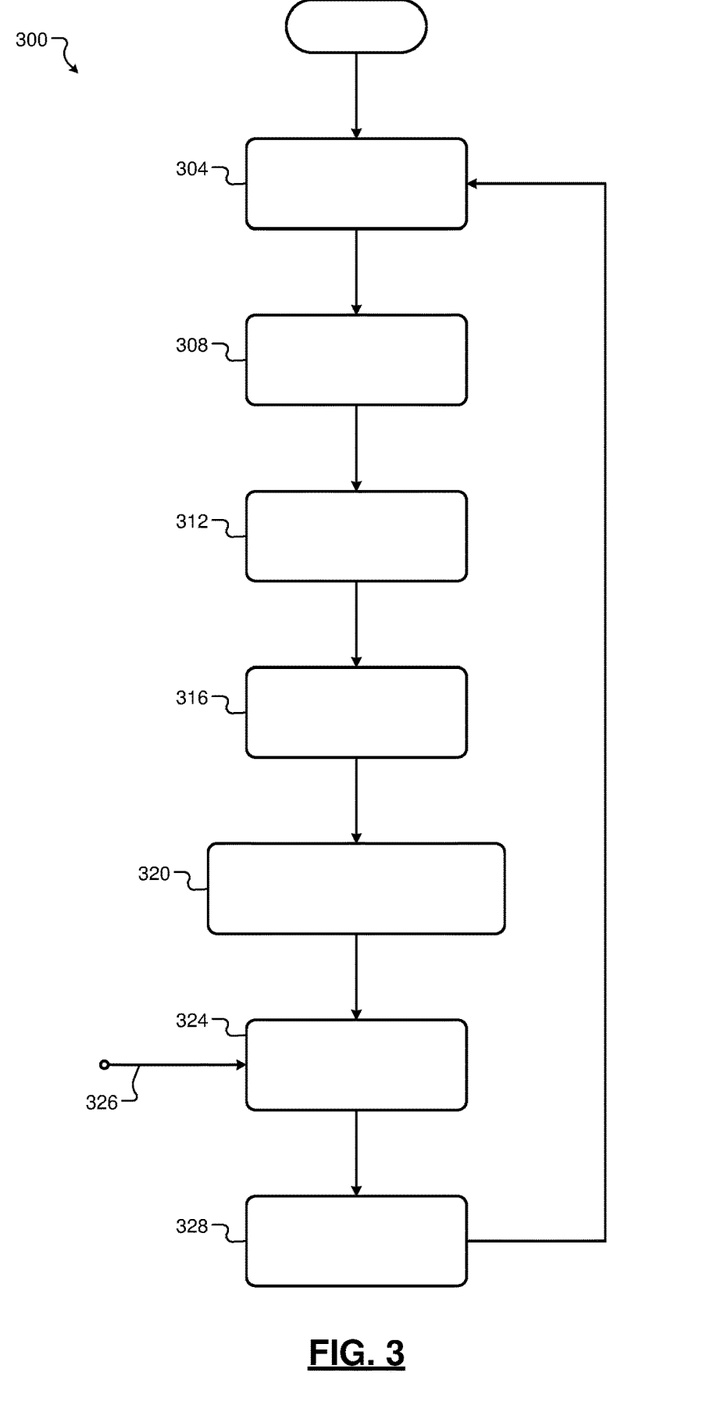
FIG. 3 illustrates steps of an example method for calculating and applying a force using magnetic motion control according to the present disclosure.

FIG. 3 illustrates steps of an example method 300 for calculating and applying a force using magnetic motion control according to the present disclosure. At 304, various sensor values and other inputs are received (e.g., by the damping system control module 204). For example, the damping system control module 204 receives inputs indicating displacement and velocity of the wheel 208. At 308, the method 300 determines a direction of wheel movement relative to the body 212 (e.g., a positive, upward direction toward the electromagnet 230 or a negative, downward direction toward the electromagnet 228).

At 312, the method 300 (e.g., the damping system control module 204 obtains a velocity component of a force to be applied by a magnetic damper pair (i.e., a force to be applied opposite a movement direction of the wheel 208). For example, the velocity component may correspond to a first force value indexed to the velocity of the wheel 208 in a first lookup table (e.g., a force/velocity lookup table). In another example, the damping system control module 204 is configured to calculate the velocity component based on a formula that relates the velocity of the wheel 208 to a desired force. For example only, the velocity component may generally increase as the velocity of the wheel 208 increases.

At 316, the method 300 (e.g., the damping system control module 204 obtains a displacement component of the force to be applied by the magnetic damper pair. For example, the displacement component may correspond to a second force value indexed to the displacement of the wheel 208 in a second lookup table (e.g., a displacement/velocity lookup table). In another example, the damping system control module 204 is configured to calculate the displacement component based on a formula that relates the displacement of the wheel 208 to a desired force. For example only, the displacement component may generally increase as displacement of the wheel 208 in the Z direction increases (e.g., as the wheel 208 moves further up or down relative to the body 212).

At 320, the method 300 (e.g., the damping system control module 204) obtains a current based on the velocity component and the displacement component of the force. For example, the current may be calculated by calculating a desired force based on an average of the velocity component and the displacement component, a weighted average of the velocity component and the displacement component, etc., and then calculating the current required to generate the calculated desired force. In some examples, the method 300 may obtain the current based only on the velocity component (i.e., step 316 may be omitted).

At 324, the method 300 (e.g., the damping system control module 204) optionally adjusts the current based on one or more additional variables, including, but not limited to, vehicle mass, center of gravity and velocity, wheelbase, vehicle height (e.g., heave or vertical displacement), pitch, yaw, wheel slip, gravity, atmospheric temperature, etc. (as indicated at 326) as described below in more detail. As one example, the calculated current is modified (e.g., multiplied by a multiplier to increase or decrease the current) based on temperature. At 328, the method 300 (e.g., the damping system control module 204) commands/controls supply of current as obtained at 320 (and as adjusted at 324) to the electromagnet 228 and/or the electromagnet 230 based on the direction of wheel movement obtained at 308.

Figure 4:
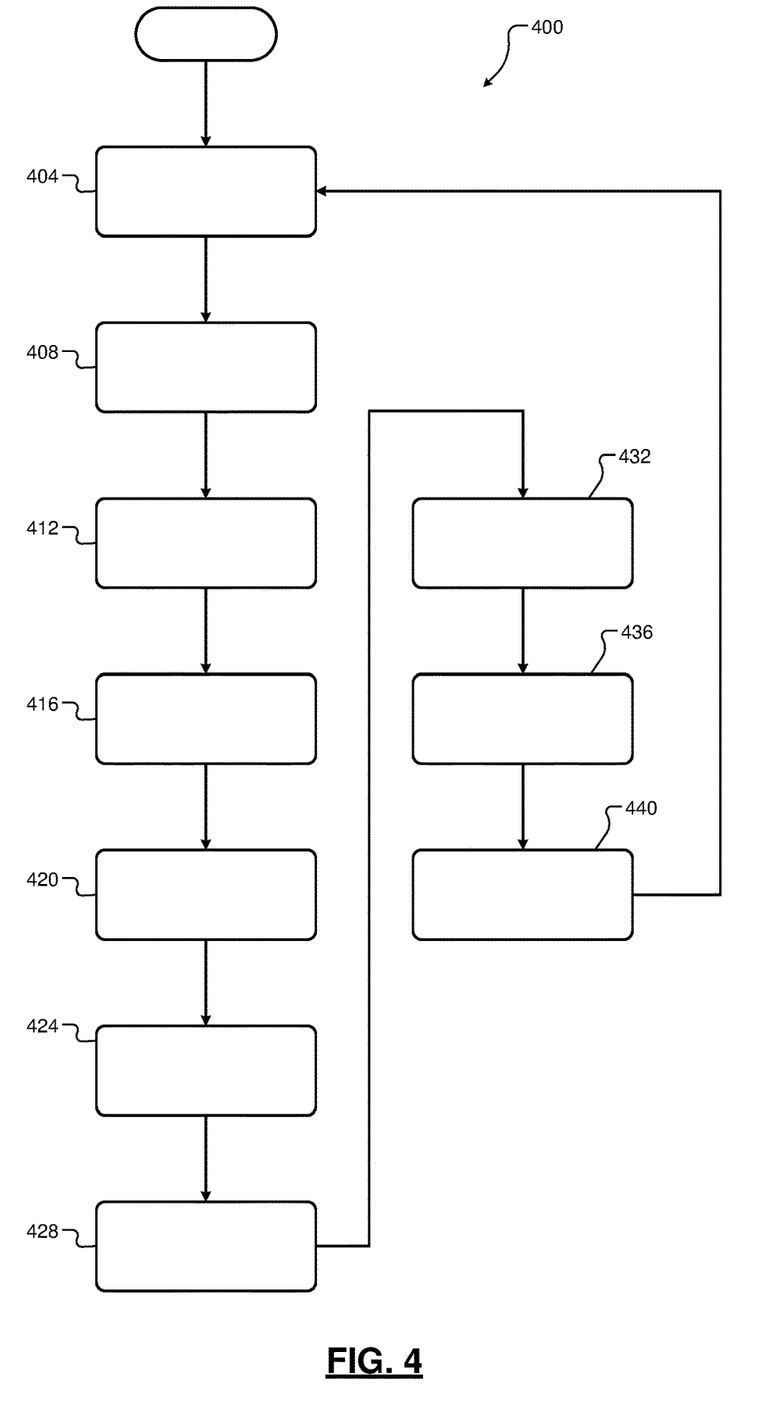
FIG. 4 illustrates steps of an example method for calculating an adjustment to the force or current obtained in FIG. 3 according to the present disclosure.

FIG. 4 illustrates steps of an example method 400 for calculating an adjustment to the force or current obtained in FIG. 3 based on additional variables such as pitch and heave (i.e., vertical displacement) of the vehicle 100 and wheel slip. For example, force adjustment components as calculated by the method 400 may be provided as an input to the method 300 as shown at 326. At 404, various sensor values and other inputs are received (e.g., by the damping system control module 204). For example, the damping system control module 204 receives inputs indicating pitch and heave of the vehicle 100 and wheel slip of each wheel of the vehicle 100.

At 408, the method 400 (e.g., the damping system control module 204) determines a pitch of the vehicle 100 based on the inputs. At 412, the method 400 determines a pitch component of the force to be applied by a magnetic damper pair based on the determined pitch of the vehicle 100. At 416, the method 400 determines a heave (e.g., center of gravity) of the vehicle 100 based on the inputs. At 420, the method 400 determines a heave component of the force to be applied by a magnetic damper pair based on the determined heave of the vehicle 100. At 424, the method 400 determines a pitch and heave force adjustment component based on the pitch and heave components. In some examples, the method 400 modifies the pitch and heave force adjustment component based on temperature.

At 428, the method 400 (e.g., the damping system control module 204) determines wheel slip of each of the wheels of the vehicle 100 based on the inputs. At 432, the method 400 determines a wheel slip component of the force to be applied by the magnetic damper pair based on the wheel slip of each wheel. For example, the method 400 may calculate, based on a position and wheel slip of each wheel, a wheel slip component corresponding to an amount of force needed to achieve equal wheel slip for each wheel of the vehicle 100. At 436, the method 400 determines wheel slip force adjustment components to add to (or subtract from) the force applied by the corresponding magnetic damper pair of each wheel. In some examples, the method 400 modifies the wheel slip force adjustment components based on temperature.

At 440, the method 400 provides the pitch and heave force adjustment component and the corresponding wheel slip force adjustment component to step 324 of FIG. 3. The force adjustment component may be a force offset (e.g., increase or decrease), a current offset (e.g., an increase or decrease to the current supplied to the magnetic damper pair), etc. Accordingly, at 324, the method 300 may adjust the current further based on the pitch and heave force adjustment component and the corresponding wheel slip force adjustment component as described above. In this manner, the force applied to a given magnetic damper pair to control wheel movement may be adjusted to compensate for pitch and heave of the vehicle 100, wheel slip, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A damping system, comprising:
   a first magnetic damper pair mounted on or proximate to a suspension system of a vehicle, the first magnetic damper pair comprising
      a first magnet mounted on a first surface of a body of the vehicle, and
      a second magnet mounted on a first moveable component of the suspension system coupled to a wheel of the vehicle;
   at least one sensor mounted on the body of the vehicle or the wheel; and
   a damping system control module configured to (i) receive, from the sensor, inputs indicative of a velocity of the wheel relative to the body of the vehicle and a displacement of the wheel relative to the body of the vehicle, (ii) calculate an amount of force to generate between the magnetic damper pair in a direction opposite a direction of movement of the wheel, and (iii) control supply of current to at least one of the first magnet and the second magnet to generate the calculated amount of force.

2. The damping system of claim 1, wherein the first magnet is an electromagnet and the second magnet is a permanent magnet.

3. The damping system of claim 1, wherein the second magnet is mounted to a control arm of the suspension system coupled between the body of the vehicle and the wheel.

4. The damping system of claim 1, further comprising a second magnetic damper pair, the second magnetic damper pair comprising a third magnet mounted on a second surface of the body of the vehicle, and a fourth magnet mounted on a second moveable component of the suspension system coupled to the wheel of the vehicle.

5. The damping system of claim 4, wherein:
   the first magnet is a first electromagnet;
   the second magnet is mounted to a first control arm of the suspension system coupled between the body of the vehicle and the wheel;
   the third magnet is a second electromagnet; and
   the fourth magnet is mounted to a second control arm of the suspension system coupled between the body of the vehicle and the wheel.

6. The damping system of claim 5, wherein the damping system control module is configured to determine the direction of movement of the wheel and selectively control the supply of current to one of the first magnet and the third magnet based on the determined direction of movement of the wheel.

7. The damping system of claim 6, wherein the damping system control module is configured to control the supply of current to the first magnet in response to a determination that the wheel is moving in a first direction and control the supply of current to the third magnet in response to a determination that the wheel is moving in a second direction.

8. The damping system of claim 1, wherein the damping system control module is configured to calculate a velocity component of a force to be applied by the first magnetic damper pair, calculate a displacement component of the force to be applied by the first magnetic damper pair, and calculate the amount of force based on the velocity component and the displacement component.

9. The damping system of claim 8, wherein the damping system control module is configured to adjust the amount of force further based on an atmospheric temperature.

10. The damping system of claim 8, wherein the damping system control module is configured to determine a pitch of the vehicle and adjust the amount of force based on the pitch of the vehicle.

11. The damping system of claim 8, wherein the damping system control module is configured to determine a heave of the vehicle and adjust the amount of force based on the heave of the vehicle.

12. The damping system of claim 8, wherein the damping system control module is configured to determine a wheel slip of the wheel and adjust the amount of force based on the wheel slip.

13. A method of controlling a damping system of a vehicle, the method comprising:
   receiving, from at least one sensor mounted on a body of the vehicle or a wheel of the vehicle, inputs indicative of a velocity of the wheel relative to the body of the vehicle and a displacement of the wheel relative to the body of the vehicle;
   calculating an amount of force to generate between a first magnet and a second magnet of a first magnetic damper pair mounted on or proximate to a suspension system of the vehicle, wherein the amount of force corresponds to force in a direction opposite a direction of movement of the wheel; and
   controlling supply of current to at least one of the first magnet and the second magnet to generate the calculated amount of force.

14. The method of claim 13, further comprising controlling supply of current to at least one of a third magnet and a fourth magnet of a second magnetic damper pair mounted on or proximate to a suspension system of the vehicle.

15. The method of claim 14, further comprising determining the direction of movement of the wheel and selectively controlling the supply of current to one of the first magnet and the third magnet based on the determined direction of movement of the wheel.

16. The method of claim 15, further comprising controlling the supply of current to the first magnet in response to a determination that the wheel is moving in a first direction and controlling the supply of current to the third magnet in response to a determination that the wheel is moving in a second direction.

17. The method of claim 13, further comprising calculating a velocity component of a force to be applied by the first magnetic damper pair, calculating a displacement component of the force to be applied by the first magnetic damper pair, and calculating the amount of force based on the velocity component and the displacement component.

18. The method of claim 17, further comprising adjusting the amount of force further based on an atmospheric temperature.

19. The method of claim 17, further comprising at least one of (i) determining a pitch of the vehicle and adjusting the amount of force based on the pitch of the vehicle and (ii) determining a heave of the vehicle and adjusting the amount of force based on the heave of the vehicle.

20. The method of claim 18, further comprising determining a wheel slip of the wheel and adjusting the amount of force based on the wheel slip.

\* \* \* \* \*